United States Patent
Koishi

(10) Patent No.: US 10,567,736 B2
(45) Date of Patent: Feb. 18, 2020

(54) THREE-DIMENSIONAL OBJECT DETECTION APPARATUS, STEREO CAMERA APPARATUS, VEHICLE, AND THREE-DIMENSIONAL OBJECT DETECTION METHOD

(71) Applicant: KYOCERA Corporation, Kyoto (JP)

(72) Inventor: Tomofumi Koishi, Tochigi (JP)

(73) Assignee: KYOCERA Corporation, Kyoto (JP)

(*) Notice: Subject to any disclaimer, the term of this patent is extended or adjusted under 35 U.S.C. 154(b) by 59 days.

(21) Appl. No.: 15/739,481

(22) PCT Filed: Jun. 23, 2016

(86) PCT No.: PCT/JP2016/003043
§ 371 (c)(1),
(2) Date: Dec. 22, 2017

(87) PCT Pub. No.: WO2016/208198
PCT Pub. Date: Dec. 29, 2016

(65) Prior Publication Data
US 2018/0324406 A1    Nov. 8, 2018

(30) Foreign Application Priority Data
Jun. 23, 2015 (JP) .................. 2015-125875

(51) Int. Cl.
| | | |
|---|---|---|
| *G06K 9/00* | (2006.01) | |
| *H04N 13/225* | (2018.01) | |
| *H04N 13/275* | (2018.01) | |

(52) U.S. Cl.
CPC ....... *H04N 13/225* (2018.05); *G06K 9/00805* (2013.01); *G06K 9/00825* (2013.01); *H04N 13/275* (2018.05)

(58) Field of Classification Search
CPC ........... G01C 11/06; G01C 3/14; G01S 11/12; G01V 8/10; G06K 9/00805;
(Continued)

(56) References Cited

U.S. PATENT DOCUMENTS 5,410,346 A    4/1995 Saneyoshi et al.
6,055,330 A *  4/2000 Eleftheriadis ........... G06T 9/007
                                                                 382/154
(Continued)

FOREIGN PATENT DOCUMENTS

JP    H05-265547 A    10/1993
JP    2011-185664 A    9/2011

OTHER PUBLICATIONS

International Search Report issued in PCT/JP2016/003043; dated Sep. 6, 2016.
(Continued)

*Primary Examiner* — Bhavesh M Mehta
*Assistant Examiner* — Ian L Lemieux
(74) *Attorney, Agent, or Firm* — Studebker & Brackett PC

(57) ABSTRACT

A three-dimensional object detection apparatus includes an input interface and a controller. The input interface accepts input of first and second images having mutual parallax in a first direction. The controller generates a parallax image that uses a pixel value to represent a difference in the first direction between positions of a subject in the first image and in the second image and divides the parallax image into a plurality of partial regions extending along a second direction. For each partial region, the controller segments a distance in the direction towards the subject into a plurality of distance intervals; and calculates, on the basis of a pixel count of pixels belonging to the distance interval, an evaluation value of a three-dimensional object belonging to the
(Continued)

distance interval. The controller uses a different threshold for each distance interval to determine whether or not a three-dimensional object is present.

6 Claims, 9 Drawing Sheets

(58) Field of Classification Search
CPC ......... G06K 9/00825; G06T 1/00; G06T 7/00; H04N 13/225; H04N 13/275
See application file for complete search history.

(56) References Cited

U.S. PATENT DOCUMENTS

| | | |
|---|---|---|
| 2012/0242799 A1 | 9/2012 | Saito |
| 2013/0223689 A1* | 8/2013 | Saito .................. G06K 9/00791 382/104 |
| 2014/0125966 A1 | 5/2014 | Phillips et al. |

OTHER PUBLICATIONS

Written Opinion issued in PCT/JP2016/003058; dated Sep. 6, 2016; with English language Concise Explanation.

* cited by examiner

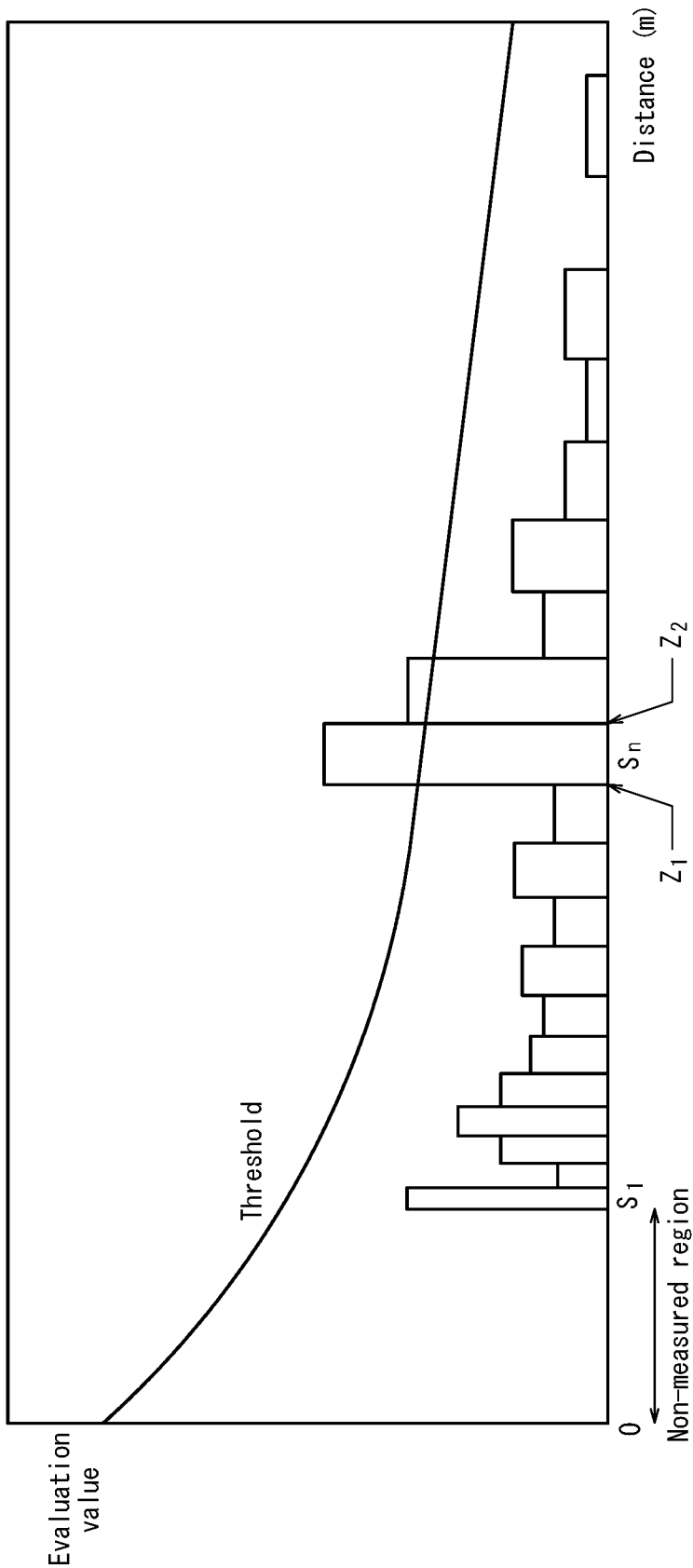

THREE-DIMENSIONAL OBJECT DETECTION APPARATUS, STEREO CAMERA APPARATUS, VEHICLE, AND THREE-DIMENSIONAL OBJECT DETECTION METHOD

CROSS-REFERENCE TO RELATED APPLICATION

The present application claims priority to and the benefit of Japanese Patent Application No. 2015-125875 filed Jun. 23, 2015, the entire contents of which are incorporated herein by reference.

TECHNICAL FIELD

The disclosure relates to a three-dimensional object detection apparatus, a stereo camera apparatus, a vehicle, and a three-dimensional object detection method.

BACKGROUND

In recent years, stereo camera apparatuses that measure the distance to a subject using a plurality of cameras have been used in vehicles such as cars. When using a stereo camera to detect a three-dimensional object and measure distance, it is not always easy to detect a three-dimensional object from a plurality of actually captured images when the images are complex. Therefore, methods have been proposed to calculate a distance distribution across the entire captured image and to discriminate obstacles on the basis of information on the distance distribution, using a three-dimensional object detection apparatus (for example, see patent literature (PTL) 1).

CITATION LIST

Patent Literature

PTL 1: JP H05-265547 A

SUMMARY

Solution to Problem

A three-dimensional object detection apparatus of the disclosure includes an input interface and a controller. The input interface accepts input of a first image and a second image having mutual parallax in a first direction. The controller generates a parallax image that uses a pixel value to represent a difference in the first direction between a position of a subject in the first image and a position of the subject in the second image. The controller divides at least a portion of the parallax image into a plurality of partial regions extending along a second direction intersecting the first direction. For each partial region, the controller segments a distance in a direction towards the subject into a plurality of distance intervals. The controller calculates, from the pixel value, the distance interval to which each pixel of the partial region belongs and calculates, on the basis of a pixel count of pixels belonging to the distance interval, an evaluation value corresponding to a length in the second direction of a three-dimensional object belonging to the distance interval. The controller determines whether a three-dimensional object is present in each distance interval on the basis of the evaluation value. The controller uses a different threshold for each distance interval to determine that a three-dimensional object is present when the evaluation value is greater than the threshold.

A stereo camera apparatus of the disclosure includes a stereo camera and a controller. The stereo camera outputs a first image and a second image having mutual parallax in a first direction. The controller generates a parallax image that uses a pixel value to represent a difference in the first direction between a position of a subject in the first image and a position of the subject in the second image. The controller divides at least a portion of the parallax image into a plurality of partial regions extending along a second direction intersecting the first direction. For each partial region, the controller segments a distance in a direction towards the subject into a plurality of distance intervals. The controller calculates, from the pixel value, the distance interval to which each pixel of the partial region belongs and calculates, on the basis of a pixel count of pixels belonging to the distance interval, an evaluation value corresponding to a length in the second direction of a three-dimensional object belonging to the distance interval. The controller determines whether a three-dimensional object is present in each distance interval on the basis of the evaluation value. The controller uses a different threshold for each distance interval to determine that a three-dimensional object is present when the evaluation value is greater than the threshold.

A vehicle of the disclosure includes a stereo camera and a controller. The stereo camera outputs a first image and a second image having mutual parallax in a first direction. The controller generates a parallax image that uses a pixel value to represent a difference in the first direction between a position of a subject in the first image and a position of the subject in the second image. The controller divides at least a portion of the parallax image into a plurality of partial regions extending along a second direction intersecting the first direction. For each partial region, the controller segments a distance in a direction towards the subject into a plurality of distance intervals. The controller calculates, from the pixel value, the distance interval to which each pixel of the partial region belongs and calculates, on the basis of a pixel count of pixels belonging to the distance interval, an evaluation value corresponding to a length in the second direction of a three-dimensional object belonging to the distance interval. The controller determines whether a three-dimensional object is present in each distance interval on the basis of the evaluation value. The controller uses a different threshold for each distance interval to determine that a three-dimensional object is present when the evaluation value is greater than the threshold. The stereo camera images an external environment of the vehicle.

A three-dimensional object detection method of the disclosure accepts, from a stereo camera, input of a first image and a second image having mutual parallax in a first direction. The three-dimensional object detection method generates a parallax image that uses a pixel value to represent a difference in the first direction between a position of a subject in the first image and a position of the subject in the second image. The three-dimensional object detection method divides at least a portion of the parallax image into a plurality of partial regions extending along a second direction intersecting the first direction. For each partial region, the three-dimensional object detection method segments a distance in a direction towards the subject into a plurality of distance intervals, calculates, from the pixel value, the distance interval to which each pixel of the partial region belongs and calculates, on the basis of a pixel count of pixels belonging to the distance interval, an evaluation value corresponding to a length in the second direction of a three-dimensional object belonging to the distance interval. The three-dimensional object detection method uses a different threshold for each distance interval, wherein a three-dimensional object is present when the evaluation value is greater than the threshold.

BRIEF DESCRIPTION OF THE DRAWINGS

In the accompanying drawings:

FIG. 9 illustrates a distance histogram and thresholds for three-dimensional discrimination.

DETAILED DESCRIPTION

An embodiment of the disclosure is described below with reference to the drawings.

Figure 1:
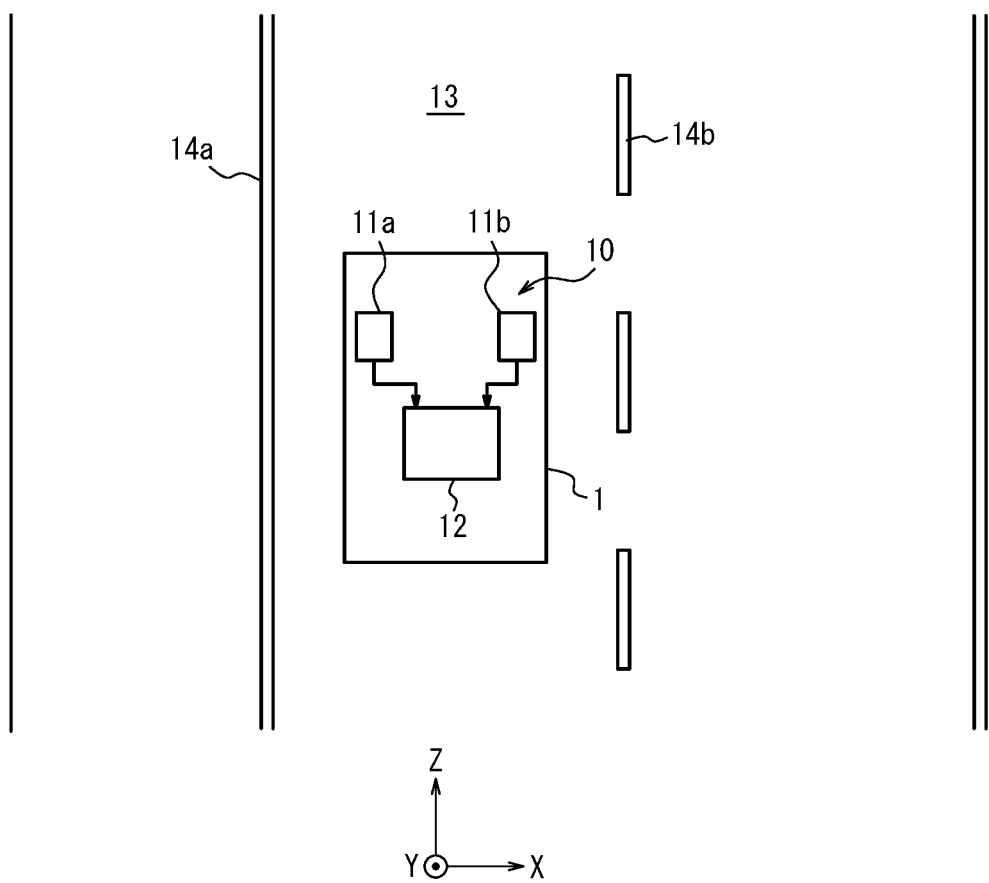
FIG. 1 is a simplified view of a vehicle that is equipped with a stereo camera apparatus and is driving along the road.

In FIG. 1, the direction of travel of a vehicle 1 (upward in FIG. 1) is referred to as the Z-direction, the vehicle width direction of the vehicle 1 (to the right in FIG. 1) is referred to as the X-direction, and the height direction that is the direction orthogonal to the X-direction and the Z-direction (the direction orthogonal to the page in FIG. 1) is referred to as the Y-direction. The Z-direction is also the direction towards a subject. Here, the term "vehicle" in the present application includes, but is not limited to, automobiles, railway vehicles, industrial vehicles, and vehicles for daily life. For example, the vehicle may include airplanes that travel down a runway. Automobiles include, but are not limited to, passenger vehicles, trucks, buses, motorcycles, trikes, and trolley buses, and may include other vehicles that drive on the road. Railway vehicles include, but are not limited to, locomotives, freight cars, passenger cars, streetcars, guided railway vehicles, ropeways, cable cars, linear motor cars, and monorails, and may include other vehicles that travel along a rail. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. Vehicles for daily life include, but are not limited to, bicycles, wheelchairs, baby carriages, wheelbarrows, and motorized, two-wheeled standing vehicles. Power engines for the vehicle include, but are not limited to, internal-combustion engines including diesel engines, gasoline engines, and hydrogen engines, and electrical engines including motors. The vehicle includes man-powered vehicles. The vehicle is not limited to the above-listed types. For example, automobiles may include industrial vehicles that can drive on the road, and the same vehicle may be included in multiple categories.

The stereo camera apparatus 10 includes a stereo camera 11 and a three-dimensional object detection apparatus 12 connected electrically to the stereo camera 11. The stereo camera 11 is configured to include two cameras, a left-side camera 11a and a right-side camera 11b. Here, a "stereo camera" refers to a plurality of cameras that have mutual parallax and that work together. The stereo camera includes at least two cameras. The stereo camera can cause the plurality of cameras to work together to image an object from a plurality of directions. Apparatuses that can cause a plurality of cameras to work together to image a subject simultaneously are encompassed by the term stereo camera. "Simultaneous" imaging is not limited to the exact same time. For example, the "simultaneous" imaging as used in the disclosure includes (i) the plurality of cameras capturing images at the same time, (ii) the plurality of cameras capturing images in response to the same signal, and (iii) the plurality of cameras capturing images at the same time according to respective internal clocks. The start time of imaging, the end time of imaging, the transmission time of captured image data, and the time at which the other device receives image data are examples of the reference time at which imaging may be considered to occur. The stereo camera may be a device that includes a plurality of cameras in a single housing. The stereo camera may also be a device that includes two or more independent cameras positioned apart from each other. In the present embodiment, the stereo camera 11 is constituted by two cameras, i.e. the left-side camera 11a and the right-side camera 11b, arranged side-by-side in the X-direction. The optical axis directions of the left-side camera 11a and the right-side camera 11b are parallel to each other and substantially face the Z-direction. The optical axis directions may be inclined perpendicularly to the Z-direction. In the disclosure, a camera having an optical mechanism that guides light incident at two separate locations to one optical detector, for example, may be adopted as the stereo camera. In the stereo camera apparatus 10, the two independent cameras, i.e. the left-side camera 11a and the right-side camera 11b, are arranged side-by-side. In the disclosure, a plurality of images of the same subject captured from different viewpoints is also referred to as a "stereo image". In the present embodiment, the entire target imaged by the left-side camera 11a and the right-side camera 11b is referred to as a "subject". The subject includes a road, a vehicle in front, an obstacle on the road, the background, and the like. A "three-dimensional object" refers to an object in actual space, in particular an object that has size in the height direction.

The left-side camera 11a and the right-side camera 11b each include an image sensor. The image sensor includes a charge-coupled device (CCD) image sensor or a complementary MOS (CMOS) image sensor. The left-side camera 11a and the right-side camera 11b may include a lens mechanism. The optical axes of the left-side camera 11a and the right-side camera 11b orientated in directions in which the same target can be imaged. The optical axes of the left-side camera 11a and the right-side camera 11b differ from each other. The optical axes and the positions of the left-side camera 11a and the right-side camera 11b are determined so as to include at least the same target in the captured images. The optical axes of the left-side camera 11a and the right-side camera 11b are oriented to be parallel to each other. The term "parallel" here is not limited to strict parallelism and includes tolerance for misalignment upon assembly, misalignment upon attachment, and misalignment over time. The optical axes of the left-side camera 11a and the right-side camera 11b are not limited to being parallel to each other and may be orientated in different directions. The left-side camera 11a and the right-side camera 11b are fixed to the body of the vehicle 1 to reduce variation in the position and the orientation relative to the vehicle 1. The optical axes of the left-side camera 11a and the right-side camera 11b may be orientated in the Z-direction or may be inclined towards the sky from the Z-direction. The orientations of the optical axes of the left-side camera 11a and the right-side camera 11b are modified appropriately for the intended use. In one of the embodiments, the optical axes of the left-side camera 11a and the right-side camera 11b are arranged such that they are orientated slightly downward from the forward direction, i.e. from the Z-direction. While the vehicle is being driven, the stereo camera apparatus 10 can image various subjects included in the external environment of the vehicle, such as a vehicle in front, an obstacle, white lines 14a, 14b, and the like on a road 13. The white lines may be considered lane markings. The left-side camera 11a and the right-side camera 11b are positioned side-by-side in the vehicle width direction, i.e. in the X-direction. The left-side camera 11a is positioned on the left side of the right-side camera 11b when facing forward, and the right-side camera 11b is positioned on the right side of the left-side camera 11a when facing forward. Because of the difference in positions of the left-side camera 11a and the right-side camera 11b, a corresponding subject appears at different positions in a first image captured by the left-side camera 11a and a second image captured by the right-side camera 11b. The first image output by the left-side camera 11a and the second image output by the right-side camera 11b are a stereo image captured from different viewpoints. In one of the embodiments, the left-side camera 11a and the right-side camera 11b can be installed on the inside of the windshield of the vehicle 1, with the optical axes orientated in the Z-direction of the vehicle 1. In an embodiment, the left-side camera 11a and the right-side camera 11b may be fixed to one of the front bumper, the fender grills, the side fenders, the light modules, and the hood (bonnet) of the vehicle 1.

The left-side camera 11a and the right-side camera 11b output captured images to the three-dimensional object detection apparatus 12 as digital data. The three-dimensional object detection apparatus 12 can perform various processes on the first image output by the left-side camera 11a and the second image output by the right-side camera 11b, such as image calibration or brightness adjustment. Furthermore, the three-dimensional object detection apparatus 12 can perform the below-described processes such as creating a parallax image and discriminating a three-dimensional object. The parallax image represents the difference in a first direction between the position of a subject in the first image and the position of the subject in the second image as a pixel value. The pixel value of each pixel in the parallax image corresponds to the distance of the subject. In the present embodiment, the "distance" refers to the distance in a direction from the left-side camera 11a and the right-side camera 11b towards the subject. In other words, the "distance" refers to the distance in the Z-direction from the left-side camera 11a and the right-side camera 11b. The "distance" is the distance in the depth direction of the stereo image by the stereo camera 11.

Figure 2:
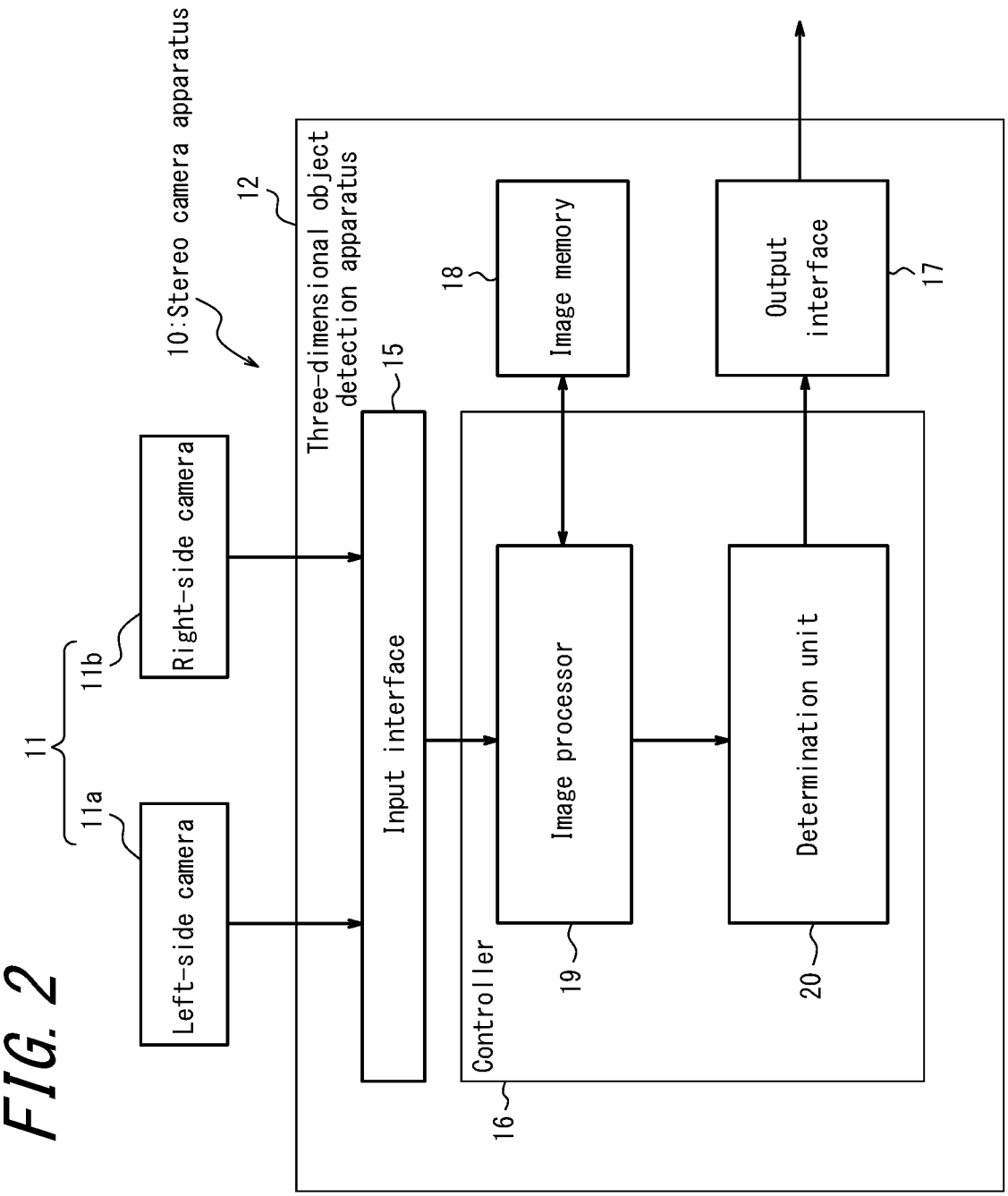
FIG. 2 is a block diagram illustrating the configuration of a stereo camera apparatus according to an embodiment.

As illustrated in FIG. 2, the stereo camera apparatus 10 includes the stereo camera 11 and the three-dimensional object detection apparatus 12. The three-dimensional object detection apparatus 12 includes an input interface 15, a controller 16, an output interface 17, and an image memory 18.

The input interface 15 is an input interface for inputting an image to the three-dimensional object detection apparatus 12. A physical connector or a wireless communication device can be used in the input interface 15. Physical connectors include an electrical connector corresponding to transmission by an electric signal, an optical connector corresponding to transmission by an optical signal, and an electromagnetic connector corresponding to transmission by an electromagnetic wave. Electrical connectors include connectors conforming to IEC60603, connectors conforming to the USB standard, connectors comprising RCA terminals, connectors comprising S terminals prescribed by EIAJ CP-1211A, and connectors comprising D terminals prescribed by EIAJ RC-5237. Electrical connectors also include connectors conforming to the HDMI® (HDMI is a registered trademark in Japan, other countries, or both) standard and connectors comprising a coaxial cable that includes a BNC connector. Optical connectors include a variety of connectors conforming to IEC 61754. Wireless communication devices include wireless communication devices conforming to standards that include Bluetooth® (Bluetooth is a registered trademark in Japan, other countries, or both) and IEEE802.11. The wireless communication device includes at least one antenna. The input interface 15 can receive input of images captured by the left-side camera 11a and the right-side camera 11b. The input interface 15 delivers the received images to the controller 16. Input to the input interface 15 includes the signal input over a wired cable and signal input over a wireless connection. The input interface 15 may correspond to the transmission method of an image signal in the stereo camera 11.

The controller 16 includes one or a plurality of processors, along with read only memory (ROM) and random access memory (RAM) that store programs and data. Processors include universal processors that execute particular functions by reading particular programs and dedicated processors that are specialized for particular processing. Dedicated processors include an application specific integrated circuit (ASIC) for a specific application. Processors include a programmable logic device (PLD). PLDs include a field-programmable gate array (FPGA). The controller 16 may be either a system-on-a-chip (SoC) or a system in a package (SiP) with one processor or a plurality of processors that work together. The controller 16 includes an image processor 19 that generates a parallax image after pre-processing the first image and the second image input from the input interface 15 and a determination unit 20 that discriminates a three-dimensional object on the basis of the parallax image generated by the image processor 19. Each of the image processor 19 and the determination unit 20 may be a hardware module or a software module. The operations performed by each of the image processor 19 and the determination unit 20 can be executed by the controller 16. The controller 16 is not limited to embodiments including the image processor 19 and the determination unit 20, and one of the image processor 19 and the determination unit 20 may be omitted. In an embodiment, the controller 16 may execute the operations of both the image processor 19 and the determination unit 20. The operations performed by the image processor 19 and determination unit 20 may be considered as being operations performed by the controller 16. The controller 16 itself may execute the processing performed by the controller 16 using either the image processor 19 or the determination unit 20.

The output interface 17 is an output interface for outputting data from the three-dimensional object detection apparatus 12. The output interface 17 can use a physical connector or a wireless communication device. In one of the embodiments, the output interface 17 is connected to a network of the vehicle 1, such as a control area network (CAN). The three-dimensional object detection apparatus 12 is connected over the CAN to a control apparatus, an alarm apparatus, and the like of the vehicle 1. The three-dimensional object detection apparatus 12 outputs information on the three-dimensional object detected by image processing, information on the distance to the three-dimensional object, and the like to the control apparatus, the alarm apparatus, and the like from the output interface 17. These pieces of information are used appropriately by each of the control apparatus and the alarm apparatus. In an embodiment, the output interface 17 and the input interface 15 are separate, but this configuration is not limiting. In an embodiment, the input interface 15 and the output interface 17 may constitute one communication interface. The communication interface is a communication interface for the stereo camera apparatus 10. The communication interface can use a physical connector or a wireless communication device.

The image memory 18 is a memory that temporarily stores the images captured by the left-side camera 11a and right-side camera 11b and input from the input interface 15. The image memory 18 may be configured as a memory independent from the processor and/or a cache memory embedded in the processor. The memory may be configured as dynamic random access memory (DRAM), static random access memory (SRAM), or the like.

Figure 3:
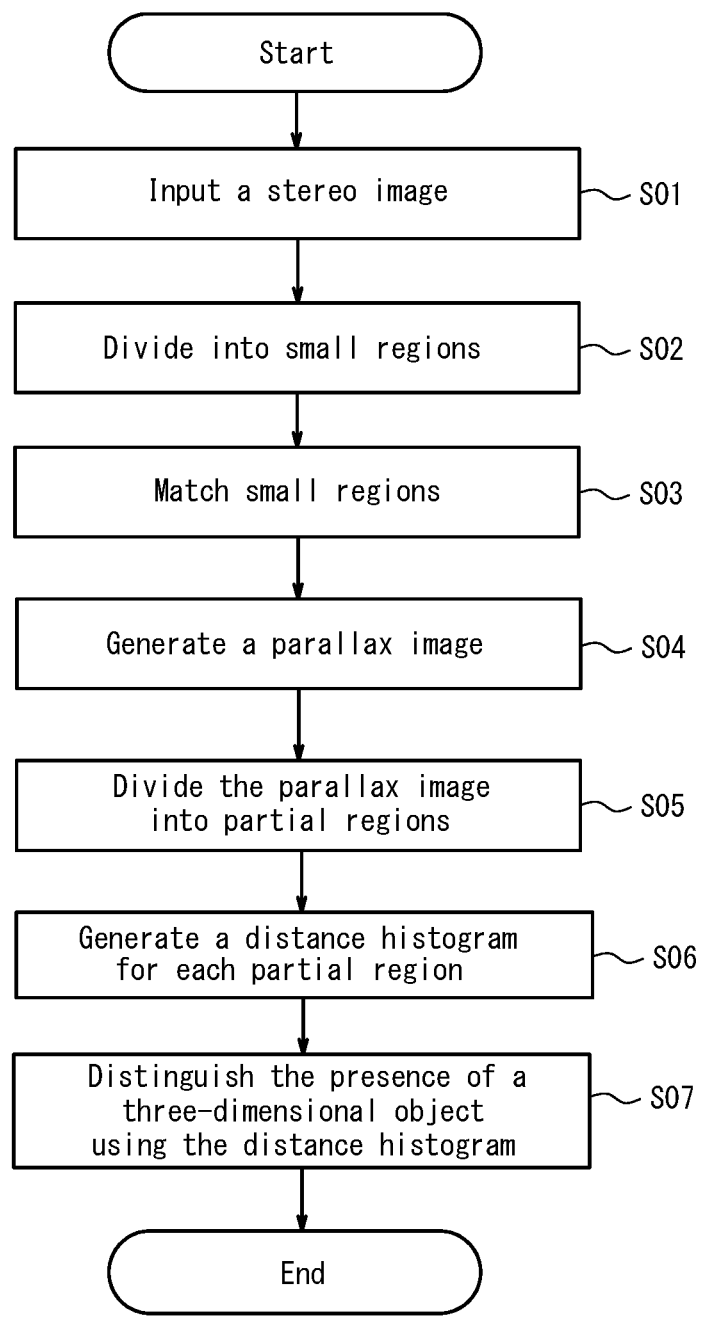
FIG. 3 is a flowchart illustrating processing by a controller to discriminate a three-dimensional object.
Figure 4:
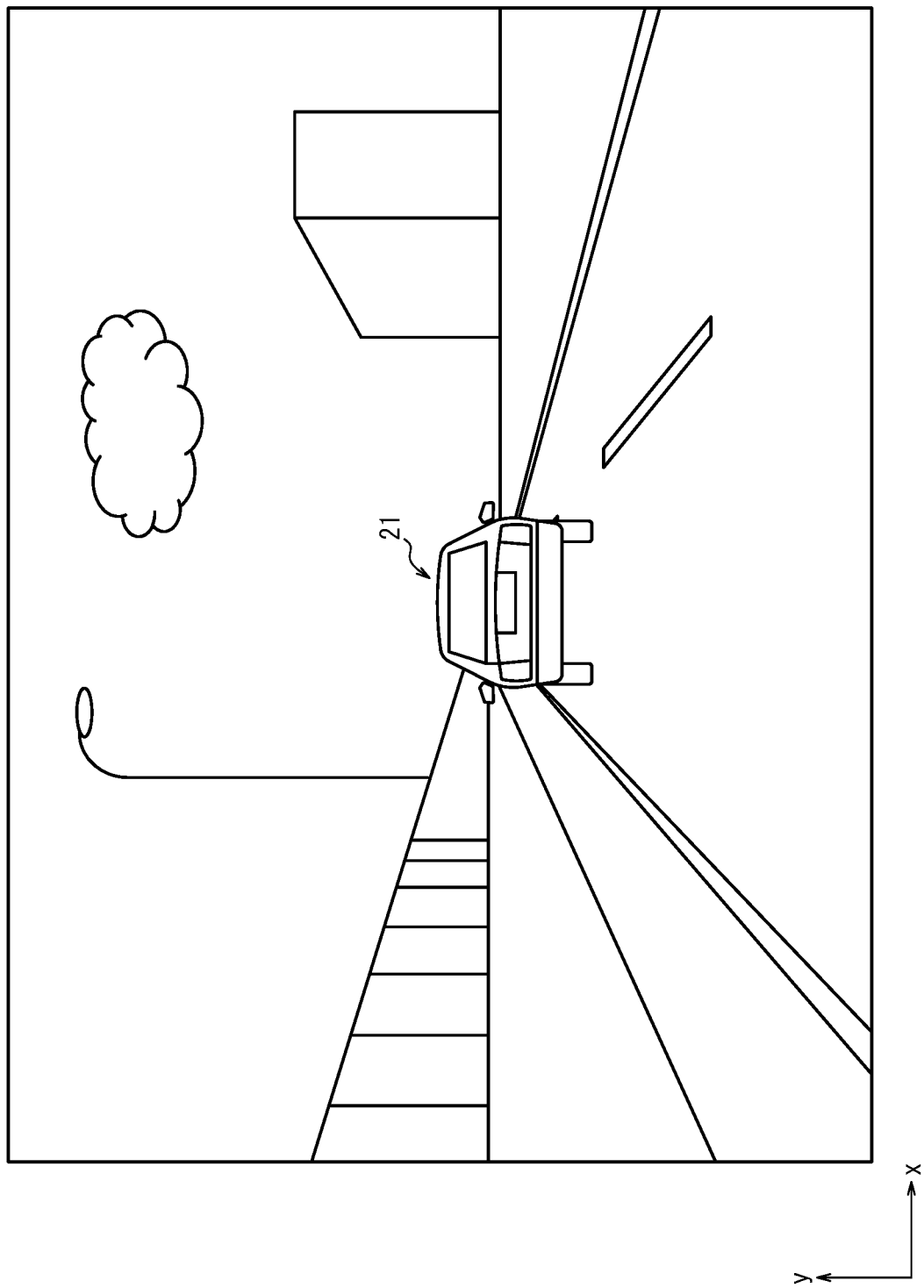
FIG. 4 illustrates an image, captured by one camera within the stereo camera, of the area in front of the vehicle.

Next, the process of the three-dimensional object detection method executed by the controller 16 is described with reference to FIG. 3. A case in which images that include a vehicle in front 21 are processed, as illustrated in FIG. 4, is described as an example.

First, the image processor 19 receives input of the first image and the second image from the input interface 15 (step S01). The image processor 19 performs image adjustment on the input images, i.e. the first image by the left-side camera 11a and the second image by the right-side camera 11b. The image adjustment may include correction of misalignment of the left-side camera 11a and the right-side camera 11b. The image processor 19 performs image correction on the basis of misalignment measured in advance. This image adjustment may include adjustment of the brightness and contrast of the image in accordance with the external environment. The stereo camera 11 may execute a portion or all of this image adjustment. The image processor 19 stores the first image and the second image that were subjected to these image adjustments in the image memory 18. The first image and the second image have mutual parallax in the x-direction corresponding to the X-direction in actual space. The x-direction is the first direction. The direction intersecting the x-direction is the y-direction. The y-direction may be orthogonal to the x-direction. The y-direction is the second direction.

Next, the image processor 19 divides the second image into small regions (step S02). The small regions are small, rectangular regions of approximately between two pixels and ten pixels on each side in the x-direction and the y-direction. For example, the small regions may be regions of four pixels in the x-direction by four pixels in the y-direction. When dividing the second image into small regions, the image processor 19 performs a small region matching process to search for a small region with a matching luminance or color pattern in the second image by shifting one pixel at a time in the x-direction within the first image from a position corresponding to a small region in the second image (step S03). For example, the image processor 19 compares the first image and the second image in corresponding groups of 4×4 pixels and determines that the small regions in the first image and the second image match when the total of the absolute value of the difference in luminance between each pixel is minimized. The image processor 19 can use the amount of misalignment between small regions in the first image and the second image at this time to calculate the distance using the principle of triangulation for each small region. The image processor 19 can calculate the parallax for the entire screen by dividing all of the regions in the second image into small regions and matching with the first image. Upon calculating the parallax for the entire screen, the image processor 19 generates a parallax image that represents the distance as a pixel value of each pixel (step S04). The pixel value of each pixel of the parallax image represents the difference in the first direction between the position of the subject in the first image and the position of the subject in the second image. The pixel value of each pixel in the parallax image represents the distance to the subject corresponding to the pixel. The parallax image may be referred to as a distance image. The method of creating a parallax image in steps S02 to S04 is well known and is disclosed in PTL 1, for example. A more detailed explanation is therefore omitted.

The matching process has been described as being performed on the first image after dividing the second image into small regions. The matching process on the image may be performed on the second image after dividing the first image into small regions. The matching process on the image may also be performed on the first image after extracting, for each pixel in the second image, a small region that includes the pixel and surrounding pixels. In this case, the parallax image has substantially the same pixel count (number of pixels) as the pixel count in the first image and the second image. In the parallax image, a numerical value representing parallax is associated with each pixel. The parallax image can be displayed as a two-dimensional image in which luminance or color is allocated to each pixel on the basis of the numerical value representing this parallax. The parallax image rendered in this way differs greatly from the first image and the second image. Three-dimensional objects included in the first image and the second image can be recognized as regions with nearly the same luminance or color in the parallax image. Accordingly, the distance, position, and size of a three-dimensional object can be understood by looking at the parallax image. In the present embodiment, however, generation of a parallax image does not require that the parallax image be displayed as a two-dimensional image. The parallax image may be generated as numerical data representing parallax associated with pixels and be used exclusively for calculation processing within the controller 16.

Next, on the basis of the parallax image generated by the image processor 19, the determination unit 20 determines whether a three-dimensional object is present and the distance to the three-dimensional object (step S05 to step S07).

First, the determination unit 20 divides the parallax image into a plurality of regions which are long in the y-direction (step S05). In the disclosure, each region of the divided parallax image is also referred to as a partial region. In the disclosure, each region of the divided parallax image is also referred to as a strip-shaped region. In the present embodiment, a strip-shaped region refers to a rectangular region with the long sides significantly longer than the short sides.

Figure 5:
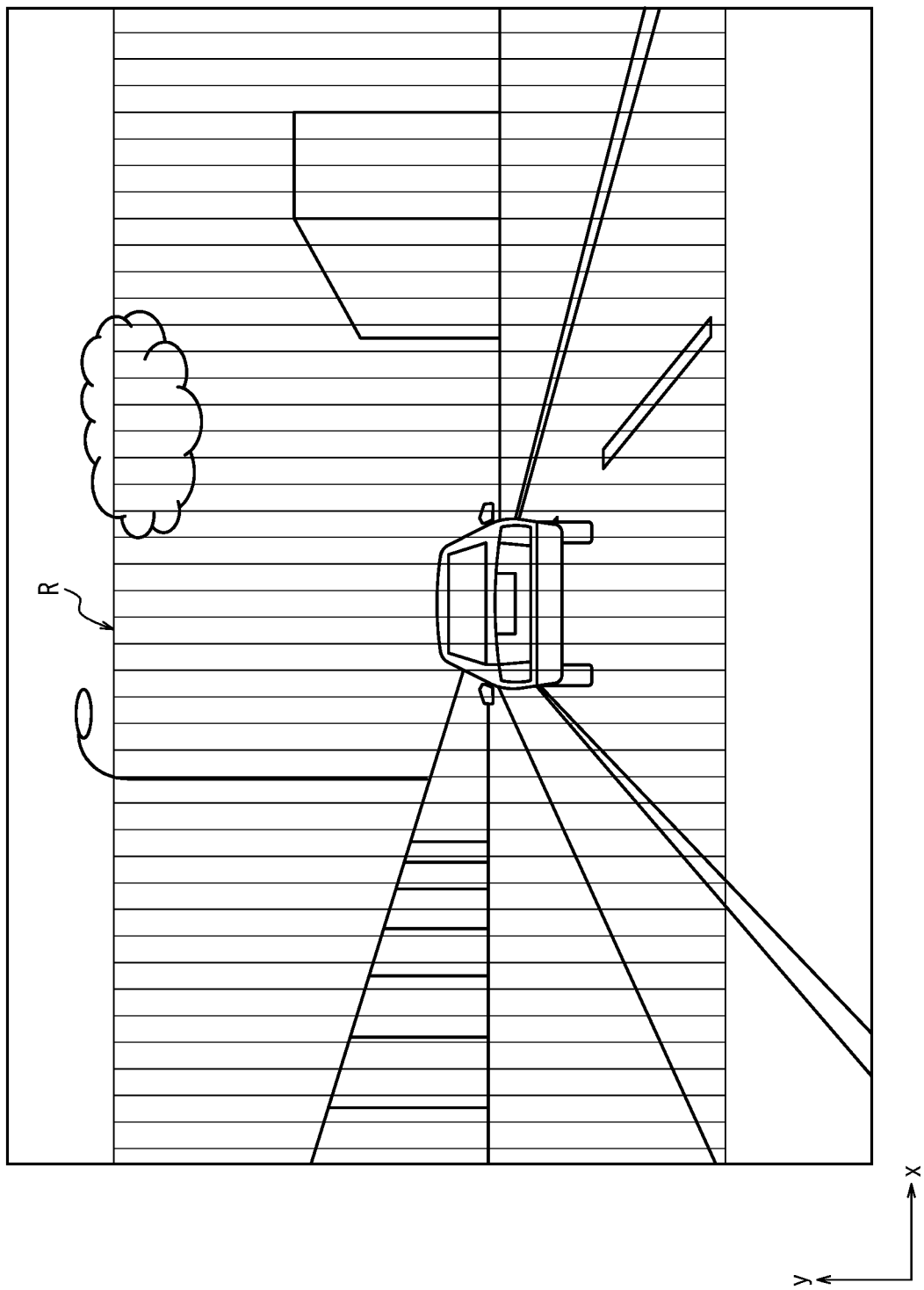
FIG. 5 illustrates a method to divide a parallax image into partial regions.

The long sides of the strip-shaped region may, for example, be five times or greater, 10 times or greater, or even 20 times or greater in length than the short sides. With reference to FIG. 5, a method to divide the parallax image into partial regions R is described. In FIG. 5, the boundaries between partial regions R are shown as overlapping the image of FIG. 4. As described above, the actual parallax image differs from the image of FIG. 4. The partial regions are used to determine whether a three-dimensional object is present in the region and the distance of the three-dimensional object. Accordingly, by reducing the width in the x-direction of each partial region, the resolution at which a three-dimensional object in the x-direction is detected increases, allowing a plurality of three-dimensional objects located at different positions in the x-direction to be discriminated simultaneously. The width in the x-direction of each partial region can be from several pixels to several tens of pixels. The determination unit 20 divides a portion of the parallax image into a plurality of partial regions. In other words, it suffices for the determination unit 20 to divide at least a portion of the parallax image into a plurality of partial regions. The partial regions in FIG. 5 do not cover a region at the uppermost portion and at the lowermost portion of the image. The reason is that an image of a three-dimensional object is not formed in these regions unless the three-dimensional object is extremely close. The partial regions may, however, be formed to cover the parallax image from the uppermost portion to the lowermost portion.

Next, the determination unit 20 creates a distance histogram for each partial region R (step S06). From the pixel value, the determination unit 20 calculates the distance interval to which each pixel included in the partial region R belongs. The distance histogram indicates the distribution of the pixel count for each distance interval. The distance intervals segment the Z-direction into a plurality of regions in accordance with the distance in the Z-direction. The distance histogram plots distance intervals along the horizontal axis and can represent the pixel count of pixels belonging to each distance interval by the height of the bin for the distance interval. Distance intervals are prescribed in advance in the determination unit 20 in accordance with distance in the Z-direction (front), with the stereo camera 11 at the origin.

Figure 6:
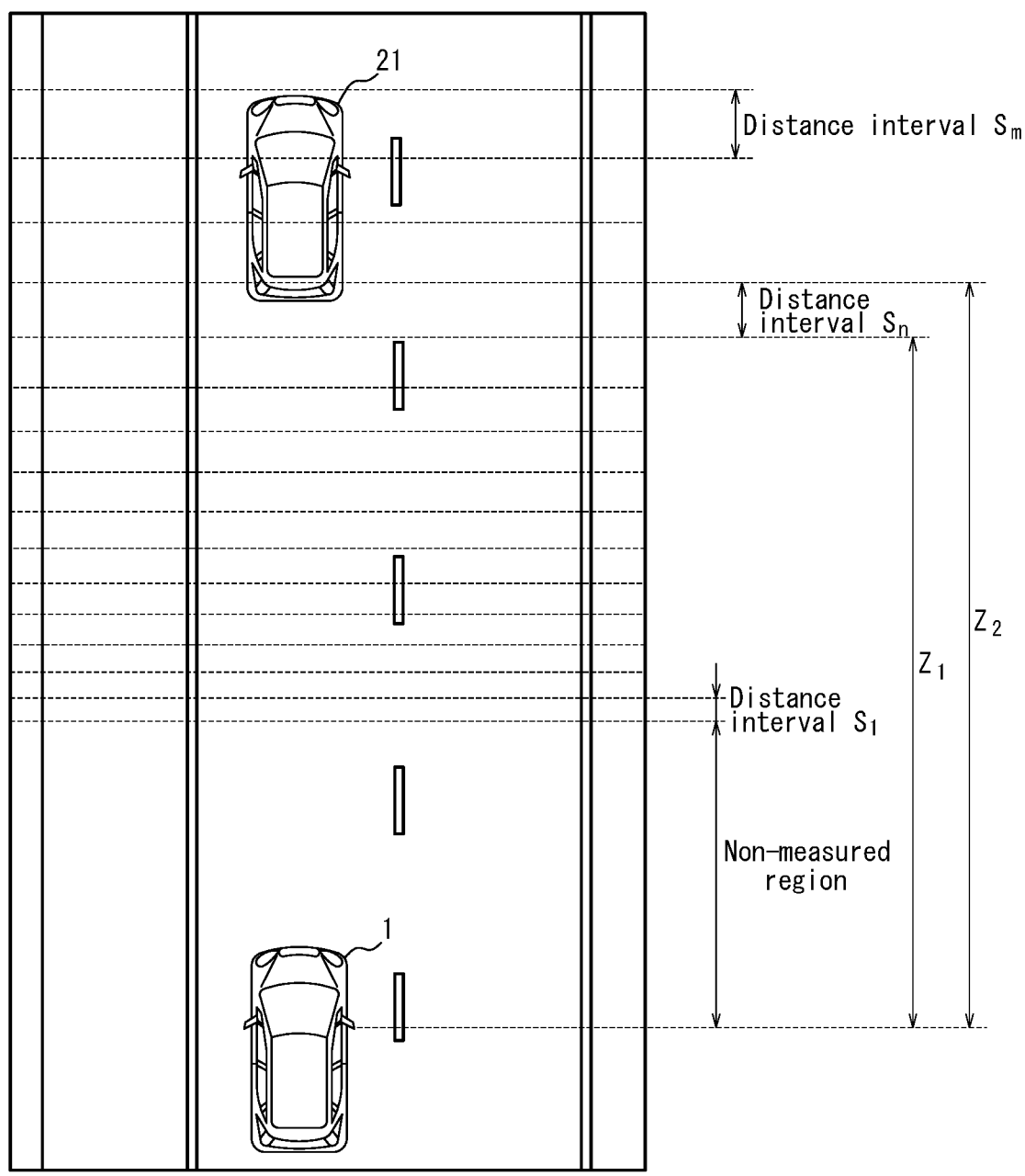
FIG. 6 illustrates an example of distance intervals segmented in front of the vehicle.

In an embodiment, the plurality of distance intervals may each have different widths between their far-side boundary and their near-side boundary. The width of each of the plurality of distance intervals may be determined by basing the width of the next distance interval on the width of the previous distance interval. In an embodiment, the plurality of distance intervals may start at the far-side boundary of the measured region. In an embodiment, a distance of 5 m, for example, may be the starting point for the distance intervals. In an embodiment, the first distance interval may, for example, have the near-side boundary at 5 m and the far-side boundary at 5 m 50 cm. In the first distance interval, the interval width between the far-side boundary and the near-side boundary is 50 cm. The boundaries of the plurality of distance intervals may be set so that the width of each distance interval increases by 10% from the second distance interval onward. In an embodiment, the width between the far-side boundary and the near-side boundary of each distance interval may be the same. FIG. 6 illustrates an example of distance intervals segmented in front of the vehicle 1. In FIG. 6, a non-measured region in which data on the pixel count is not counted extends to 5 m in front of the position of the stereo camera 11 of the vehicle 1. The distance intervals in FIG. 6 are set so that their widths expand sequentially in the Z-direction from the distance interval $S_1$ closest to the vehicle 1. In FIG. 6, the distance from the vehicle 1 to the near-side boundary is $Z_1$ and to the far-side boundary of the $n^{th}$ distance interval $S_n$ is $Z_2$.

In an embodiment, the non-measured region is set in advance to 5 m. The non-measured region is not, however, limited to 5 m. For example, the uppermost portion of a three-dimensional object with the minimum height to be detected by the stereo camera apparatus 10 is assumed to be higher than the position at which the stereo camera 11 is set. The closest distance to the road imaged by the stereo camera 11 and the closest distance at which the uppermost portion of a three-dimensional object with the minimum height to be detected by the stereo camera apparatus 10 is imaged by the stereo camera 11 are calculated, and the non-measurement distance is set to the longer of the distances. If this non-measurement distance is at least the longer of the distances, then the height direction of the entire three-dimensional object with the minimum height targeted for measurement falls within the stereo image.

After preparing the distance histogram in accordance with step S06, the determination unit 20 determines whether a three-dimensional object is present using the distance histogram (step S07). Typically, the threshold used for determination of the presence of a three-dimensional object with a conventional technique is, to a certain extent, a large value to avoid false recognition. However, when three-dimensional objects are far away, a three-dimensional object that is actually large is displayed as a small object in the image. Therefore, it might not be possible to detect faraway three-dimensional objects if a constant threshold is set for the distance histogram. In the present embodiment, different thresholds accounting for distance are used for each distance interval in the determination of three-dimensional objects, as described below.

Figure 7:
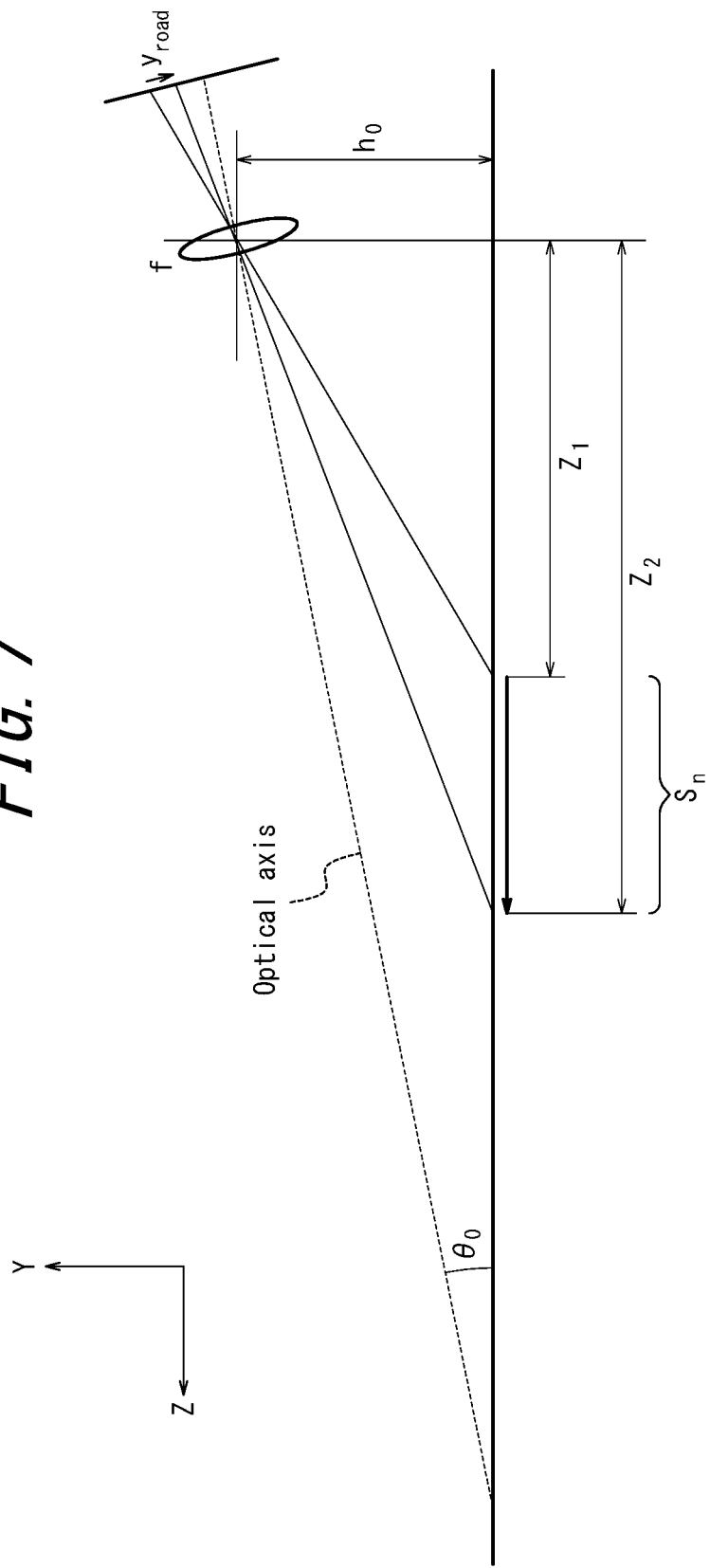
FIG. 7 illustrates the height, in the image, corresponding to the road of one distance interval.

Using FIG. 7, the height in the image corresponding to the road of one distance interval $S_n$ is described. In FIG. 7, f is the focal length of the imaging lens of the stereo camera 11, $\theta_0$ is the angle of depression in the optical axis direction of the imaging lens of the stereo camera 11, and $h_0$ is the attachment height of the stereo camera 11. In other words, f, $\theta_0$, and $h_0$ are respectively the focal length, the angle of depression, and the attachment height of the optical system that imaged the first image and the second image. According to a pinhole model, the height $y_{road}$ of an image corresponding to the road between the far-side boundary and the near-side boundary of the distance interval $S_n$ can be represented by Expression (1) below.

$$y_{road} = f \cdot \left( \tan\left[\tan^{-1}\left(\frac{h_0}{Z_1}\right) - \theta_0\right] - \tan\left[\tan^{-1}\left(\frac{h_0}{Z_2}\right) - \theta_0\right] \right) \quad (1)$$

Accordingly, even if a group of pixels belonging to the same distance interval with a lower height than $y_{road}$ exists within the parallax image, the group of pixels cannot be discriminated from the road or from a flat object with no thickness on the road. In the parallax image, the pixels of the parallax image belonging to the distance interval in which a three-dimensional object exists are assumed to be arrayed along the width in the x-direction of a partial region. In this case, a three-dimensional object belonging to the distance interval cannot be discriminated unless the product of the pixel count of pixels side-by-side in the y-direction and the pixel pitch is greater than the height $y_{road}$ of the image of the road in the distance interval.

Figure 8:
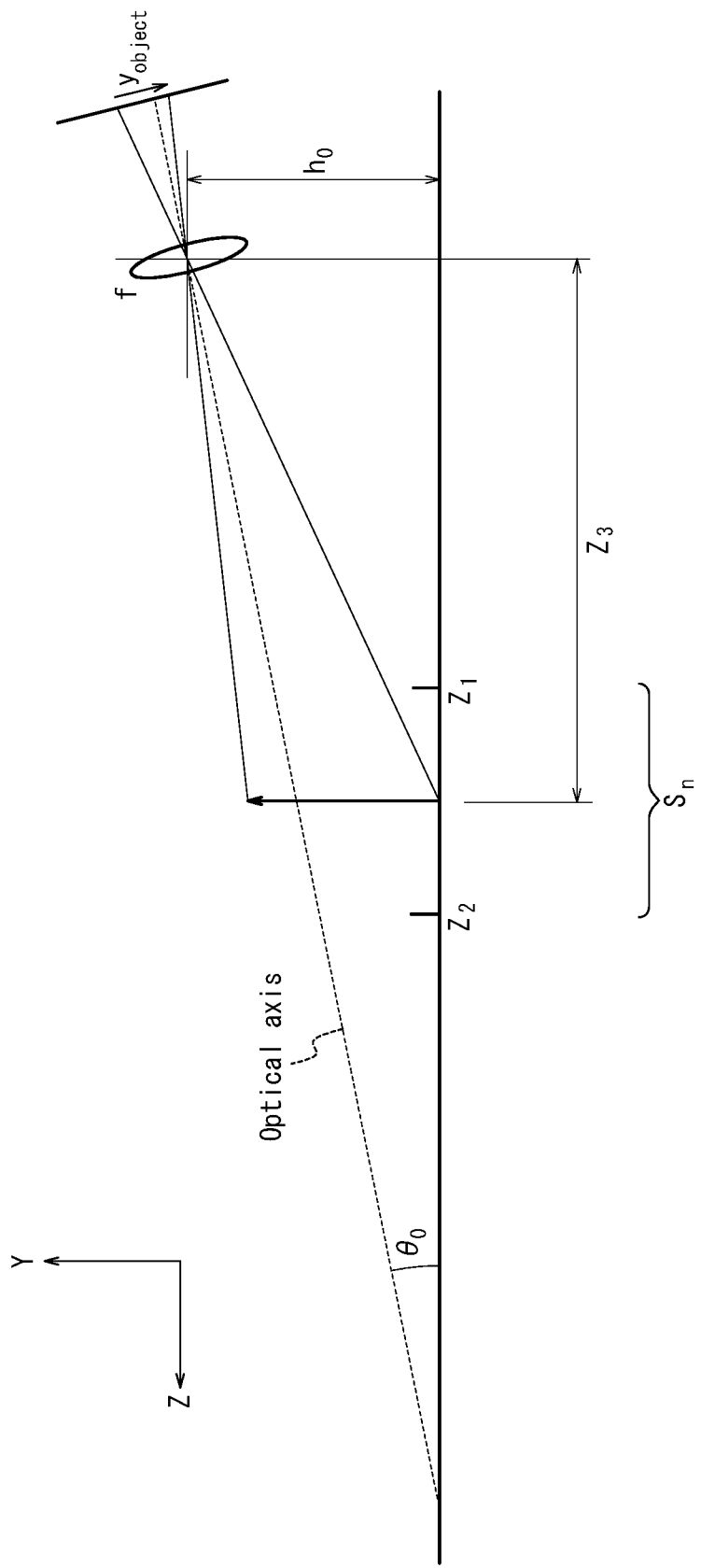
FIG. 8 illustrates the height, in the image, of a three-dimensional object belonging to one distance interval.

Using FIG. 8, the height of a three-dimensional object in an image is described a case in which the three-dimensional object exists in one distance interval $S_n$. Here, the three-dimensional object is assumed to be positioned at a distance $Z_3$ ($Z_1 \leq Z_3 \leq Z_2$), and the height of the three-dimensional object is assumed to be Y. The height $y_{object}$ of the three-dimensional object in the image can be represented by Expression (2) below.

$$y_{object} = \frac{f \cdot Y}{Z_3} \quad (2)$$

Accordingly, a three-dimensional object of height Y is displayed as a group of pixels belonging to the same distance interval as the height $y_{object}$ in the parallax image. A three-dimensional object can always be determined to be a three-dimensional object when the length in the y-direction of a group of pixels belonging to the distance interval in which the three-dimensional object is present is greater than the $y_{object}$ obtained by substituting $Y_{min}$ for Y in Expression (2), where $Y_{min}$ is the smallest height of a three-dimensional object to be detected. By comparison with this value $y_{object}$, a three-dimensional object that is higher than the height $Y_{min}$ that needs to be detected can be determined to be a three-dimensional object. The length in the y-direction of a group of pixels may be the product of the pixel count of pixels side-by-side in the y-direction and the pixel pitch when the pixels belonging to the distance interval of the parallax image are arrayed along the width in the x-direction of a partial region.

From the above considerations, the determination unit 20 tallies the pixel count of pixels belonging to a distance interval segmented in advance, divides by the pixel count in the x-direction of the partial region, and treats the result as an evaluation value of the distance interval. The evaluation value corresponds to the pixel count of pixels side-by-side in the y-direction when the pixels included in the distance interval are arrayed along the width in the x-direction of a partial region. Since multiplying the pixel count by the pixel pitch results in length, the evaluation value corresponds to the length in the y-direction of an object belonging to the distance interval. The determination unit 20 compares this evaluation value with a threshold, Th, that has a different value for each distance interval. The determination unit 20 determines that a three-dimensional object exists when the evaluation value is greater than the threshold. The threshold, Th, of each distance interval is selected so as to satisfy Conditional Expression (3) below, where f is the focal length of the optical system that captured the stereo image, $\theta_0$ is the angle of depression of the optical system that captured the stereo image, $h_0$ is the attachment height of the optical system that captured the stereo image, $Z_1$ is the near-side boundary and $Z_2$ is the far-side boundary of the distance interval of a determination target, $Z_3$ is the deemed distance to a predetermined three-dimensional object for each distance interval, $Y_{min}$ is the minimum height of a three-dimensional object to be detected, and P is the pixel pitch of the image.

$$f \cdot \left(\tan\left[\tan^{-1}\left(\frac{h_0}{Z_1}\right) - \theta_0\right] - \tan\left[\tan^{-1}\left(\frac{h_0}{Z_2}\right) - \theta_0\right]\right)/P < Th < \frac{f \cdot Y_{min}}{Z_3}/P \quad (3)$$

If the threshold, Th, in Conditional Expression (3) is set smaller than the left side of the expression, the road or a flat object with no thickness on the road might end up being detected. If the threshold is set greater than the right side of expression, it might not be possible to detect a portion of a three-dimensional object that is larger than $Y_{min}$ in the perpendicular direction and that should be detected. Setting the threshold to the range of Conditional Expression (3) allows detection of only three-dimensional objects while preventing three-dimensional objects larger than a desired size from passing undetected. Conditional Expression (3) may be applied in the Z-direction starting from the above-described non-measured region and extending further away.

Next, as an example, thresholds for detecting three-dimensional objects are listed by applying actual numerical values. Table 1 below lists the specifications and settings of the stereo camera 11.

TABLE 1

Specifications and Settings of the Stereo Camera

| | |
|---|---|
| Attachment height of camera ($h_0$) | 1.3 m |
| Angle of depression of camera ($\theta_0$) | 5° |
| Focal length (f) | 4 mm |
| Minimum height of three-dimensional object ($Y_{min}$) | 500 mm |

In this case, the distance to the boundary of each distance interval, the height of an image on the road to be calculated, and the height of an image of a three-dimensional object having the minimum height to be detected are listed in Table 2.

TABLE 2

Distance to boundary of each distance interval along with image height of road and of smallest three-dimensional object

| Distance z to boundary of distance interval (mm) | Image height of road (mm) | Image height of smallest three-dimensional object (mm) |
|---|---|---|
| 5.00 | 0.091 | 0.400 |
| 5.50 | 0.083 | 0.364 |
| 6.05 | 0.076 | 0.331 |
| 6.66 | 0.069 | 0.301 |
| 7.32 | 0.063 | 0.273 |
| 8.05 | 0.058 | 0.248 |
| 8.86 | 0.052 | 0.226 |
| 9.74 | 0.048 | 0.205 |
| 10.72 | 0.044 | 0.187 |
| 11.79 | 0.040 | 0.170 |
| 12.97 | 0.036 | 0.154 |
| 14.27 | 0.033 | 0.140 |
| 15.69 | 0.030 | 0.127 |
| 17.26 | 0.027 | 0.116 |
| 18.99 | 0.025 | 0.105 |
| 20.89 | 0.023 | 0.096 |
| 22.97 | 0.021 | 0.087 |
| 25.27 | 0.019 | 0.079 |
| 27.80 | 0.017 | 0.072 |
| 30.58 | 0.015 | 0.065 |
| 33.64 | 0.014 | 0.059 |
| 37.00 | 0.013 | 0.054 |
| 40.70 | 0.012 | 0.049 |
| 44.77 | 0.011 | 0.045 |
| 49.25 | 0.010 | 0.041 |
| 54.17 | 0.009 | 0.037 |
| 59.59 | 0.008 | 0.034 |
| 65.55 | 0.007 | 0.031 |
| 72.10 | 0.007 | 0.028 |
| 79.32 | 0.006 | 0.025 |
| 87.25 | 0.005 | 0.023 |
| 95.97 | 0.005 | 0.021 |

In Table 2, the "Distance z to boundary of distance interval (m)" indicates the distance $Z_1$ to the near-side boundary in order from the first interval. For the second distance interval and onward, the distance z is also the distance $Z_2$ to the far-side boundary of the previous distance interval. For example, the distance z=5.5 m is both the far-side boundary of the first distance interval and the near-side boundary of the second distance interval. The "Image height of road (mm)" represents the height of the image of the road in the distance interval for which the distance z is the near-side boundary. The "Image height of smallest three-dimensional object (mm)" is the height of the image of the smallest three-dimensional object to be detected in each distance interval. The deemed distance $Z_3$ to the three-dimensional object is calculated as $Z_3=Z_1$ in each distance interval. For example, in the first distance interval from 5 m to 5.5 m, $Z_1=Z_3=5.00$ m, $Z_2=5.5$ m, the image height of the road is 0.091 m, and the smallest image height is 0.400 mm. By setting the threshold Th between these values 0.091 mm and 0.400 mm, a three-dimensional object higher than the $Y_{min}=500$ mm can be discovered successfully.

As is clear from Table 2, the threshold, Th, may be a smaller value as the distance z is greater. In the distance histogram exemplified in FIG. 9, the horizontal direction represents distance intervals. The height of the bin of each distance interval indicates the evaluation value. The evaluation value is calculated on the basis of the pixel count of pixels belonging to each distance interval. FIG. 9 uses a curve to illustrate an example of thresholds of the evaluation values for three-dimensional discrimination. Overall, the evaluation values are higher at close distances and lower at far distances. In the example in FIG. 9, the vehicle in front 21 illustrated in FIG. 4 is present, and the evaluation value corresponding to the pixel count of pixels belonging to the distance interval $S_n$, which corresponds to the distance to the back side of the vehicle in front 21, is high. In this situation, the determination unit 20 uses a different threshold for each distance interval in accordance with distance and discriminates the presence of a three-dimensional object when the evaluation value is greater than the threshold. The determination unit 20 can reduce erroneous detection of the road or the like at a position near the vehicle 1 and can detect a three-dimensional object positioned in the distance interval $S_n$ more accurately than with a conventional technique. The threshold Th is reduced even further depending on distance, allowing the determination unit 20 to detect a three-dimensional object more accurately than with a conventional technique when the three-dimensional object is even more distant.

As described above, the determination unit 20 in the present embodiment uses different thresholds in accordance with distance for each distance interval in the partial regions R and determines that a three-dimensional object is present when the evaluation value is greater than the threshold. As a result, the determination unit 20 can more successfully discriminate a three-dimensional object than with a conventional technique from a close distance to a far distance within the measurement range. In particular, by setting the threshold in accordance with Conditional Expression (3), instances where the road or a flat object with no thickness on the road is falsely recognized as a three-dimensional object can be reduced, and a three-dimensional object with at least the height to be detected can be detected as a three-dimensional object. The determination unit 20 may also discriminate the position in the x-direction at which the three-dimensional object is present on the basis of a partial region, among the partial regions divided in the x-direction, in which the three-dimensional object has been determined to be present.

The disclosure is not limited to the above embodiments. A variety of modifications and changes to embodiments of the disclosure are possible within the scope of the disclosure. For example, the number of cameras mounted in the stereo camera apparatus is not limited to two. Three or more cameras may be used instead. The definition of the evaluation value and the method for setting the threshold of the evaluation value are not limited to the above described example. Thresholds may be set in accordance with a variety of evaluation values and definitions of evaluation values. For example, the controller 16 may use the pixel count of pixels belonging to each distance interval of the distance histogram directly as the evaluation value and set the threshold in conjunction with this evaluation value.

In the above embodiment, the controller 16 calculates the evaluation value of each distance interval as the result of dividing the pixel count of pixels belonging to the distance interval in a partial region by the pixel count of pixels in the x-direction of the partial region. The controller 16 may calculate a different value as the evaluation value. After dividing the above-described pixel count by the pixel count of pixels in the x-direction of the partial region, the controller 16 may multiply the result by a correction coefficient to calculate the evaluation value. The correction coefficient is the result of dividing the number of pixels obtained within a partial region by the number of effective pixels obtained within the partial region. The controller 16 may calculate the correction coefficient before calculating the evaluation value. By multiplying by the correction coefficient, the controller 16 can detect a three-dimensional object taking into consideration missing pixels in the parallax image.

REFERENCE SIGNS LIST

1 Vehicle
10 Stereo camera apparatus
11 Stereo camera
11a Left-side camera
11b Right-side camera
12 Three-dimensional object detection apparatus
13 Road
14a, 14b White line
15 Input interface
16 Controller
17 Output interface
18 Image memory
19 Image processor
20 Determination unit
21 Vehicle in front
R Partial region
S Distance interval

The invention claimed is:

1. A three-dimensional object detection apparatus comprising:
an input interface circuit; and
a controller, wherein
the input interface is configured to accept input of a first image and a second image having mutual parallax in a first direction,
the controller is configured to
generate a parallax image that uses a pixel value to represent a difference in the first direction between a position of a subject in the first image and a position of the subject in the second image, and divide at least a portion of the parallax image into a plurality of partial regions extending along a second direction intersecting the first direction, the controller is configured, for each partial region, to
segment a distance in a direction towards the subject into a plurality of distance intervals,
calculate, from the pixel value, the distance interval to which each pixel of the partial region belongs,
calculate, on the basis of a pixel count of pixels belonging to the distance interval, an evaluation value corresponding to a length in the second direction of a three-dimensional object belonging to the distance interval, and
determine whether a three-dimensional object is present in each distance interval on the basis of the evaluation value, the controller is configured to use a different threshold for each distance interval to determine that a three-dimensional object is present when the evaluation value is greater than the threshold, the evaluation value is calculated by dividing the pixel count of each distance interval by a pixel count of the partial region in the first direction, and the threshold satisfies a conditional expression, $$f \cdot \left( \tan\left[ \tan^{-1}\left(\frac{h_0}{Z_1}\right) - \theta_0 \right] - \tan\left[ \tan^{-1}\left(\frac{h_0}{Z_2}\right) - \theta_0 \right] \right) / P < Th < \frac{f \cdot Y_{min}}{Z_3} / P \qquad (1)$$

where Th is the threshold, f is a focal length of an optical system that captured the first image and the second image, $\theta_0$ is the angle of depression of the optical system that captured the first image and the second image, $h_0$ is the attachment height of the optical system that captured the first image and the second image, $Z_1$ is a near-side boundary and $Z_2$ is a far-side boundary of a distance interval of a determination target, $Z_3$ is a deemed distance to a predetermined three-dimensional object for the distance interval of the determination target, $Y_{min}$ is a minimum height of a three-dimensional object to be detected, and P is a pixel pitch of an image.

2. The three-dimensional object detection apparatus of claim 1, wherein the threshold becomes a smaller value with increasing distance in the direction towards the subject.

3. The three-dimensional object detection apparatus of claim 1, wherein the conditional expression is applied at a distance equal to or greater than a distance at which a three-dimensional object with a minimum height targeted for determination is entirely included in the first image and the second image.

4. A stereo camera apparatus comprising:
a stereo camera; and
a controller, wherein
the stereo camera is configured to output a first image and a second image having mutual parallax in a first direction,
the controller is configured to
generate a parallax image that uses a pixel value to represent a difference in the first direction between a position of a subject in the first image and a position of the subject in the second image, and
divide at least a portion of the parallax image into a plurality of partial regions extending along a second direction intersecting the first direction, the controller is configured, for each partial region, to
segment a distance in a direction towards the subject into a plurality of distance intervals,
calculate, from the pixel value, the distance interval to which each pixel of the partial region belongs,
calculate, on the basis of a pixel count of pixels belonging to the distance interval, an evaluation value corresponding to a length in the second direction of a three-dimensional object belonging to the distance interval, and
determine whether a three-dimensional object is present in each distance interval on the basis of the evaluation value, the controller is configured to use a different threshold for each distance interval to determine that a three-dimensional object is present when the evaluation value is greater than the threshold, the evaluation value is calculated by dividing the pixel count of each distance interval by a pixel count of the partial region in the first direction, and the threshold satisfies a conditional expression, $$f \cdot \left( \tan\left[ \tan^{-1}\left(\frac{h_0}{Z_1}\right) - \theta_0 \right] - \tan\left[ \tan^{-1}\left(\frac{h_0}{Z_2}\right) - \theta_0 \right] \right) / P < \qquad (1)$$

$$Th < \frac{f \cdot Y_{min}}{Z_3} / P$$

where Th is the threshold, f is a focal length of an optical system that captured the first image and the second image, $\theta_0$ is the angle of depression of the optical system that captured the first image and the second image, $h_0$ is the attachment height of the optical system that captured the first image and the second image, $Z_1$ is a near-side boundary and $Z_2$ is a far-side boundary of a distance interval of a determination target, $Z_3$ is a deemed distance to a predetermined three-dimensional object for the distance interval of the determination target, $Y_{min}$ is a minimum height of a three-dimensional object to be detected, and P is a pixel pitch of an image.

5. A vehicle comprising:
a stereo camera; and
a controller, wherein
the stereo camera is configured to output a first image and a second image having mutual parallax in a first direction,
the controller is configured to
generate a parallax image that uses a pixel value to represent a difference in the first direction between a position of a subject in the first image and a position of the subject in the second image, and
divide at least a portion of the parallax image into a plurality of partial regions extending along a second direction intersecting the first direction, the controller is configured, for each partial region, to
segment a distance in a direction towards the subject into a plurality of distance intervals,
calculate, from the pixel value, the distance interval to which each pixel of the partial region belongs,
calculate, on the basis of a pixel count of pixels belonging to the distance interval, an evaluation value corresponding to a length in the second direction of a three-dimensional object belonging to the distance interval, and
determine whether a three-dimensional object is present in each distance interval on the basis of the evaluation value, the controller is configured to use a different threshold for each distance interval to determine that a three-dimensional object is present when the evaluation value is greater than the threshold, the stereo camera is configured to image an external environment of the vehicle, the evaluation value is calculated by dividing the pixel count of each distance interval by a pixel count of the partial region in the first direction, and the threshold satisfies a conditional expression, $$f \cdot \left( \tan\left[ \tan^{-1}\left(\frac{h_0}{Z_1}\right) - \theta_0 \right] - \tan\left[ \tan^{-1}\left(\frac{h_0}{Z_2}\right) - \theta_0 \right] \right) \Big/ P < \quad (1)$$

$$Th < \frac{f \cdot Y_{min}}{Z_3} \Big/ P$$

where Th is the threshold, f is a focal length of an optical system that captured the first image and the second image, $\theta_0$ is the angle of depression of the optical system that captured the first image and the second image, $h_0$ is the attachment height of the optical system that captured the first image and the second image, $Z_1$ is a near-side boundary and $Z_2$ is a far-side boundary of a distance interval of a determination target, $Z_3$ is a deemed distance to a predetermined three-dimensional object for the distance interval of the determination target, $Y_{min}$ is a minimum height of a three-dimensional object to be detected, and P is a pixel pitch of an image.

6. A three-dimensional object detection method comprising:

accepting, from a stereo camera, input of a first image and a second image having mutual parallax in a first direction;

generating a parallax image that uses a pixel value to represent a difference in the first direction between a position of a subject in the first image and a position of the subject in the second image; and dividing at least a portion of the parallax image into a plurality of partial regions extending along a second direction intersecting the first direction;

for each partial region, segmenting a distance in a direction towards the subject into a plurality of distance intervals;

calculating, from the pixel value, the distance interval to which each pixel of the partial region belongs; and calculating, on the basis of a pixel count of pixels belonging to the distance interval, an evaluation value corresponding to a length in the second direction of a three-dimensional object belonging to the distance interval; and using a different threshold for each distance interval, and determining that a three-dimensional object is present when the evaluation value is greater than the threshold, wherein the evaluation value is calculated by dividing the pixel count of each distance interval by a pixel count of the partial region in the first direction, and the threshold satisfies a conditional expression, $$f \cdot \left( \tan\left[ \tan^{-1}\left(\frac{h_0}{Z_1}\right) - \theta_0 \right] - \tan\left[ \tan^{-1}\left(\frac{h_0}{Z_2}\right) - \theta_0 \right] \right) \Big/ P < \quad (1)$$

$$Th < \frac{f \cdot Y_{min}}{Z_3} \Big/ P$$

where Th is the threshold, f is a focal length of an optical system that captured the first image and the second image, $\theta_0$ is the angle of depression of the optical system that captured the first image and the second image, $h_0$ is the attachment height of the optical system that captured the first image and the second image, $Z_1$ is a near-side boundary and $Z_2$ is a far-side boundary of a distance interval of a determination target, $Z_3$ is a deemed distance to a predetermined three-dimensional object for the distance interval of the determination target, $Y_{min}$ is a minimum height of a three-dimensional object to be detected, and P is a pixel pitch of an image.

* * * * *